Figure 1:
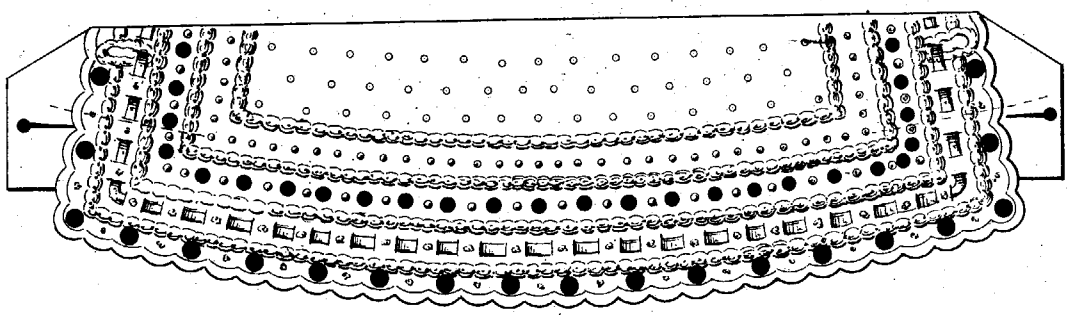
Figure 2:
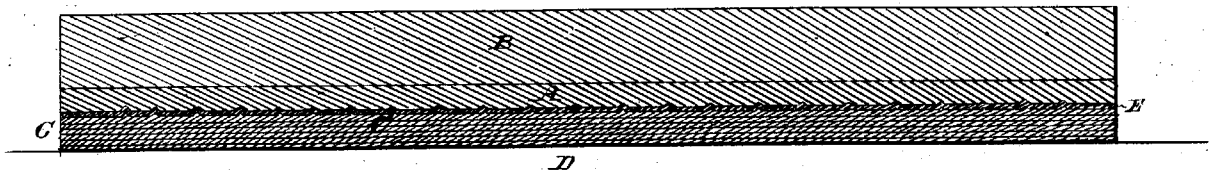

W. E. LOCKWOOD.

Ladies' Collars and Cuffs.

No. 5,259. Reissued Jan. 28, 1873.

Attest;
M L Gardner.
Wm Howard

Inventor;
William E Lockwood
By his attys.
Howson & Son

UNITED STATES PATENT OFFICE.

WILLIAM E. LOCKWOOD, OF PHILADELPHIA, PENNSYLVANIA.

IMPROVEMENT IN LADIES' COLLARS AND CUFFS.

Specification forming part of Letters Patent No. 23,771, dated April 26, 1859; reissue No. 1,980, dated June 6, 1865; reissue No. 5,259, dated January 28, 1873.

*To all whom it may concern:*

Be it known that I, WILLIAM E. LOCKWOOD, of Philadelphia, county of Philadelphia, State of Pennsylvania, have invented certain Improvements in Collars, Cuffs, &c., of which the following is a specification:

My invention consists of a collar or cuff having a paper surface imitative of the textile surface of a collar or cuff of textile fabric.

In carrying out my invention I use a fabric composed of paper and muslin, or equivalent fabric, having a smooth white polished or enameled paper surface to represent that of starched linen.

I will now proceed to describe one of the modes of manufacturing imitations of and substitutes for linen collars and cuffs.

I first select the linen or muslin cuff or collar which I desire to imitate; this I stretch on or cement to a flat board, with the side to be imitated uppermost. When dry the surface of the cuff or collar is covered with a coating of plumbago or its equivalent, and an electrotype taken from it. The counter-die is made by pasting a number of pieces of paper together and, while they are in a damp state, placing them on the platform of an ordinary press, and then forcing the die onto the paper and permitting it to remain in contact therewith until the paper is dry, when the die and counter-die are ready for use. A piece of the fabric having the above-mentioned paper surface is then cut to the size of the desired imitation cuff or collar to be manufactured, and after being slightly moistened is placed on the counter-die and the die pressed upon it. The electrotype die will impart to the smooth polished or enameled white paper surface of the imitation an exact representation of the textile surface of the original, all the threads of which will be clearly indicated on the said imitation; and in addition whatever ornamental projections or depressions there may be on the original will be imparted to the said paper surface. After removal from the dies the edges of the imitation cuff or collar may be trimmed, and holes for receiving the studs or other fastenings cut or punched out, when the cuff or collar will be complete.

Instead of using flat dies, as shown in the drawing, two rollers, with surfaces made to impart the desired textile appearance to the paper surface of the imitation, may be used.

It will be evident that the invention is applicable to shirt-bosoms, &c.

I do not confine myself to any particular appliances or machinery for embossing the fabric; but

I claim, as a new article of manufacture—

A collar having a paper surface imitative of the textile face and fiber of a dressed linen collar, as set forth.

In testimony whereof I have signed my name to this specification in the presence of two subscribing witnesses.

WILLIAM E. LOCKWOOD.

Witnesses:

H. HOWSON,

WM. A. STEEL.